United States Patent [19]
Bar

[11] Patent Number: 6,057,973
[45] Date of Patent: May 2, 2000

[54] METHOD OF SEEKING TO TAPE SEGMENT WITHOUT THE USE OF INTER-SEGMENT GAP

[76] Inventor: Refael Bar, 8792 Calle Trager, San Diego, Calif. 92129

[21] Appl. No.: 08/950,455

[22] Filed: Oct. 15, 1997

[51] Int. Cl.$^7$ .................................................. G11B 15/093
[52] U.S. Cl. ...................... 360/72.3; 360/74.2; 242/333.7
[58] Field of Search .................................. 360/72.3, 72.1, 360/72.2, 71, 74.2, 73.14; 242/333.6, 333.7

[56] References Cited

U.S. PATENT DOCUMENTS

| | | | |
|---|---|---|---|
| 4,393,445 | 7/1983 | Milligan et al. | 360/72.2 |
| 5,347,407 | 9/1994 | Solhjell et al. | 360/74.1 X |
| 5,546,557 | 8/1996 | Allen et al. | 360/49 X |
| 5,710,676 | 1/1998 | Fry et al. | 360/72.3 X |
| 5,757,571 | 5/1998 | Basham et al. | 360/72.1 |
| 5,828,511 | 10/1998 | Bar | 360/72.2 X |

FOREIGN PATENT DOCUMENTS 1-171145  7/1989  Japan .

*Primary Examiner*—Thang V. Tran
*Assistant Examiner*—James L Habermehl
*Attorney, Agent, or Firm*—Woodcock Washburn Kurtz Mackiewicz & Norris LLP

[57] ABSTRACT

A tape drive comprising a processor which determines a position to which to move a recording tape without detecting inter-segment gaps on the tape. The tape drive includes a drive motor which periodically outputs pulses during rotation. The rotation of the motor and the displacement of the tape are linearly related. When the processor receives an instruction to move the tape a predetermined number of segments, the number of segments is converted into a length based on the format of the tape. The length is correlated to a total number of motor pulses to be counted as the tape is moved in order to stop the tape at proper location.

8 Claims, 5 Drawing Sheets

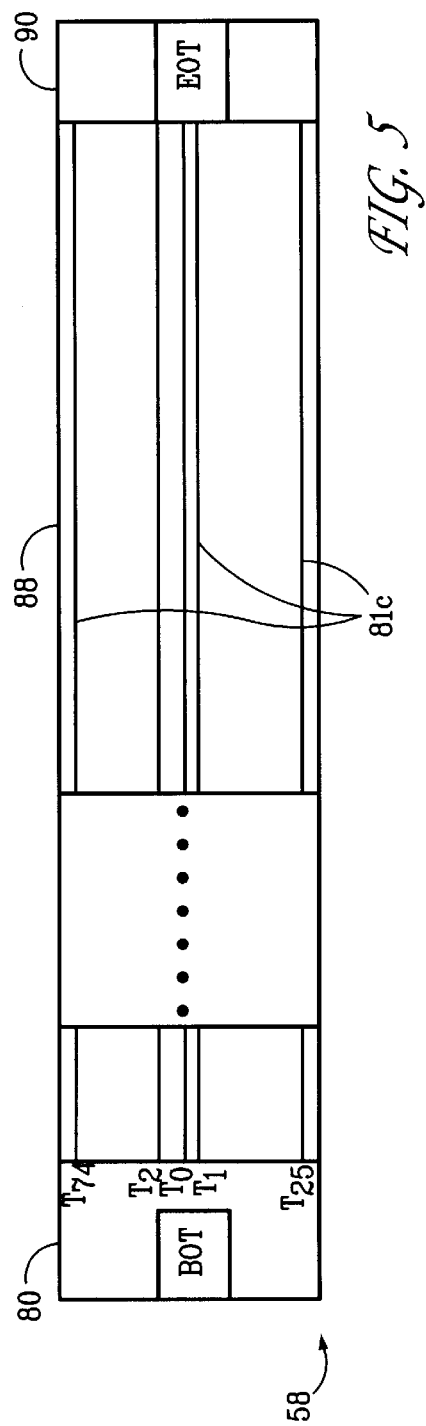

METHOD OF SEEKING TO TAPE SEGMENT WITHOUT THE USE OF INTER-SEGMENT GAP

FIELD OF THE INVENTION

The present invention relates to cartridge based data storage systems. More particularly, the present invention relates to an apparatus and method for positioning a recording tape without detecting and/or counting inter-segment gaps on the recording tape to determine a position of the tape.

BACKGROUND OF THE INVENTION

Cartridge based tape and disk data storage devices have been in use in the computer industry for several decades. Primarily, the cartridge based tape storage devices have been used as sequential access devices, whereby new files are added to the tape by appending them to the last file stored on the tape. During that time, a number of tape cartridge styles emerged. One popular cartridge style is based on a design that is disclosed in U.S. Pat. No. 3,692,255, to Von Behren. That design contains two rotatable reels that are fixed within a rectangular housing. A length of tape is wound around the reels along a predetermined tape path, which extends along a front peripheral edge of the cartridge and across a tape access opening. A drive belt extends around drive belt rollers and contacts a portion of the tape on each reel to move the tape back and forth between the reels and across the tape access opening. A drive puck, positioned near the inside front of the cartridge, contacts a drive roller, which provides a mechanism to move the drive belt.

Tape cartridges and tape drives have become an increasingly important feature in computer systems. The popularity of tape cartridges is driven in part by the large storage capacities and low cost of storage they provide. In general, the storage capacity of a particular tape cartridge is dictated by a variety of factors including the length of tape, the width of the tape, the materials used to produce the tape and the recording density of the tape. Even with the cost and capacity advantages offered by tape storage solutions, the tape drive has primarily found use in computer systems as a back-up device, in which duplicates of files that were originally stored to a random access storage device, such as a hard disk drive, are stored for sequential access on a tape cartridge.

The popularity of these tape drive and cartridges have spawned several tape drive and cartridge standards. One popular tape cartridge and tape drive standard is defined in the specification entitled "Serial Recorded Magnetic Tape Minicartridge for Information Interchange," QIC-3020-MC, Revision H, Mar. 20, 1996. This standard defines a variety of important features related to tape cartridges such as tape width, recording format, track format, segment format, and so on.

Typically, tape drives are used in hard disk drive back-up procedures. Files contained on a hard disk drive are stored on tracks on the recording tape in a sequential fashion in accordance with the format of the tape. That is, each new file is appended after the last file stored on the tape. Additionally, files that are accessed infrequently can be stored on tape and permanently removed from the hard drive. As a result, valuable hard disk file space is available for more immediate file needs.

In the event of a loss of files on the hard drive, the files can be retrieved from the tape and restored to the hard disk drive. To perform this task, the tape within the cartridge must be appropriately positioned to retrieve such files. If a user desires to restore a few selected files, it is possible that the tape will be repositioned several times during the restore procedure. Conventional tape positioning techniques include detecting and counting erased gaps between formatted segments (i.e., inter-segment gaps) on the tape. This technique is described in the document entitled, "Command Set Interface Specification for Flexible Disk Controller Based Mini Data Cartridge Tape Drives," QIC-117, Revision J, Aug. 28, 1996. As described in the standard, host software passes arguments to the tape drive indicating the relative number of segments to traverse in either the forward or reverse direction. When the arguments are received by the tape drive, the drive moves the tape at high speed while detecting the inter-segment gaps until the number of segments traversed satisfies the request of the host software. In accordance with the standard, to properly position the tape, the number of segments traversed is one greater than the number of segments requested by the passed arguments.

A disadvantage of this method is that the erased gaps must be accurately detected and counted during the high speed movement of the tape. Often, gaps are not detected because of track-to-track interference, or the failure of the recording head to accurately track the recording tracks on the tape during high speed movement due to, for example, misalignment of the head. Further, the number of segments traversed may be affected by the tape drive motor start and stop times. To illustrate the potential track-to-track interference problem, the QIC-3020-MC standard calls for a quarter-inch tape to have 40 parallel tracks. The track position tolerances are to be within 0.0011 inches (±0.0279 mm) of their define positions, and the nominal track spacing is 0.006 inch (0.1524 mm). Thus, a slight misalignment of the tape within the cartridge or of the head in the tape drive may cause severe degradation of the signal and an increase in the track-to-track interference.

Inaccurate detection of the erased gaps may cause delays or errors in the restoration process, and in the worst case scenario, the total failure of the tape to be properly positioned. Such delays, errors and failures are very often inconvenient and frustrating to users of tape drives who are typically restoring important inaccessible or destroyed data files under stressful situations. Therefore, there is a need for an improved tape positioning system that offers advantages over the prior art. The present invention provides such a tape positioning system.

SUMMARY OF THE INVENTION

In view of the above, the present invention, through one or more of its various aspects and/or embodiments is thus presented to accomplish one or more objects and advantages, such as those noted below.

The present invention is directed to method and apparatus for positioning a tape within tape cartridge. In accordance with an aspect of the present invention, a method for positioning a recording tape loaded into tape drive is provided, where the recording tape includes data written in segments which are defined by a format of the recording tape. The method includes determining the format of the tape, receiving a command indicative of a predetermined number of segments to move the recording tape, and converting the predetermined number of segments to a distance value in accordance with the format. The distance value is utilized by the tape drive to move the recording tape.

According to a feature of the present invention, the method further includes moving the recording tape, detecting the relative movement of the recording tape until the distance value is attained, and stopping the recording tape.

According to another feature, the step of converting may include determining a movement length in accordance with the predetermined number of segments and a length of a segment and a length of an inter-segment gap which disposed between adjacent segments, and calculating the distance value in accordance with the movement length. The process of calculating may include determining a number of pulses per unit of movement length of tape generated by a tape drive motor, and calculating the distance value in accordance with the movement length and the number of pulses per unit of movement length.

According to another aspect of the present invention, a tape drive for reading, writing and positioning a recording tape is provided where the recording tape includes data written in segments which are defined by a format of the recording tape. The tape drive comprises a processor, a non-volatile memory, a tape format detection device, a recording head positioning and controlling device, and a drive motor. The processor receives an instruction to move the recording tape a predetermined number of segments and converts the predetermined number of segments to a distance value in accordance with the format of the recording tape.

According to a feature of the present invention, the drive motor periodically outputs a signal to the processor which is indicative of rotation of the drive motor, and the processor detects the relative movement of the recording tape based on the signal until the distance value is attained, and thereafter, instructs the drive motor to stop the recording tape.

According to another feature, a counter is incremented upon receipt of the signal, a current value of the counter being compared with the distance value, and when the current value equals the distance value, the drive motor is stopped.

According to yet another feature, the processor determines a movement length in accordance with the predetermined number of segments, and a length of each segment and a length of an inter-segment gap which is disposed between adjacent segments. The processor calculates the distance value in accordance with the movement length.

According to a further feature, the processor determines a number of pulses per unit movement length of tape generated by a tape drive motor, and calculates the distance value in accordance with the movement length and the number of pulses per unit movement length.

According to still another feature, the drive motor periodically outputs pulses indicative of rotation of the drive motor to a counter, the counter incrementing a current value upon receipt of the pulses, and the processor compares the current value to the distance value, and when the current value equals the distance value, instructs the drive motor to stop the recording tape.

According to another feature, the distance value is correlated to a rotational amount of the drive motor, such that when the drive motor is operated to move the tape, the distance value is compared to the rotational amount of the drive motor to determine a position to stop the recording tape.

According to yet another feature, the tape drive further comprises a hall effect sensor which outputs pulses to the processor.

According to still another feature, the drive motor comprises magnetic poles which are detected by the hall effect sensor, such that when the hall effect sensor detects the magnetic poles, the pulses are output to the processor.

Other features of the invention are described below.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like references numerals represent similar parts throughout the several views of the drawings, it being understood, however, that the invention is not limited to the specific methods and instrumentalities disclosed. In the drawings:

FIG. 5 is a diagram of the layout of a tape utilized in the tape drive system of the present invention;

FIG. 6 depicts an exemplary tape format in accordance with the QIC standard.

DETAILED DESCRIPTION OF PREFERRED EMBODIMENT

Figure 1:
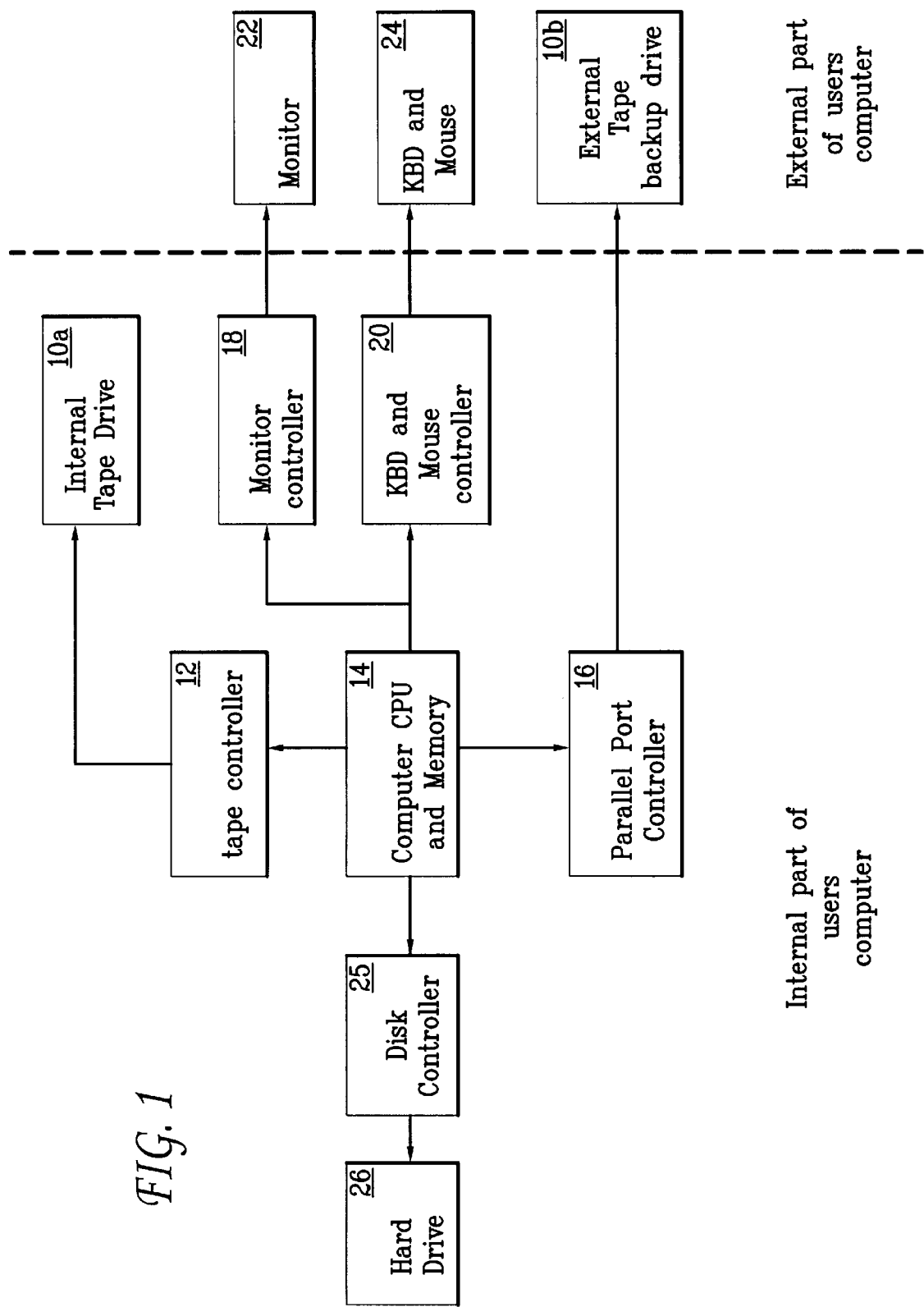
FIG. 1 is a block diagram of a computer system with a tape drive system in accordance with the present invention.

The present invention provides a method and apparatus for positioning a tape without the need for detecting and counting inter-segment gaps. FIG. 1 is a block diagram of an exemplary computer system with a tape drive systems in accordance with the present invention. As shown, the computer system is divided between internal and external components. The internal components include a CPU and memory 14 that control the overall functioning of the computer system. A tape controller 12 is connected between the CPU and memory 14 and an internal tape drive 10a. A hard disk drive 26 is also connected to CPU and memory 14. A disk controller 25 provides the interface between hard disk 26 and CPU and memory 14. Other controller are connected to CPU and memory 14 to provide an interface between a variety of external devices and CPU and memory 14. For example, a parallel port controller 16, a monitor controller 18, and a keyboard and mouse controller 20 each provide an interface between CPU and memory 14 and external tape drive 10b, monitor 22, and key board and mouse device 24, respectively. The exemplary system of FIG. 1 is configured with two tape drives 10 to emphasize that a drive 10 according to the present invention can be implemented in either internal or external form. However, unlike the system depicted in FIG. 1, many computer systems will likely contain only an internal drive 10a or an external drive 10b, but not both.

The computer system functions generally similar to the functioning of a standard computer system. An operating system, programs, and data files are stored on hard drive 26 for execution on CPU and memory 14. User interaction with the systems is provided by Keyboard and Mouse 24 and visual output is provided via monitor 22. As explained more fully below, tape drive 10 provides dual functionality of allowing the user to backup the files on hard disk drive 26 and to use tape drive 10 as a random access device, much like hard disk drive 26. CPU and memory 14 interact with the tape drive 10a and 10b to store files, back-up hard disk drive 25, and so on.

Figure 2:
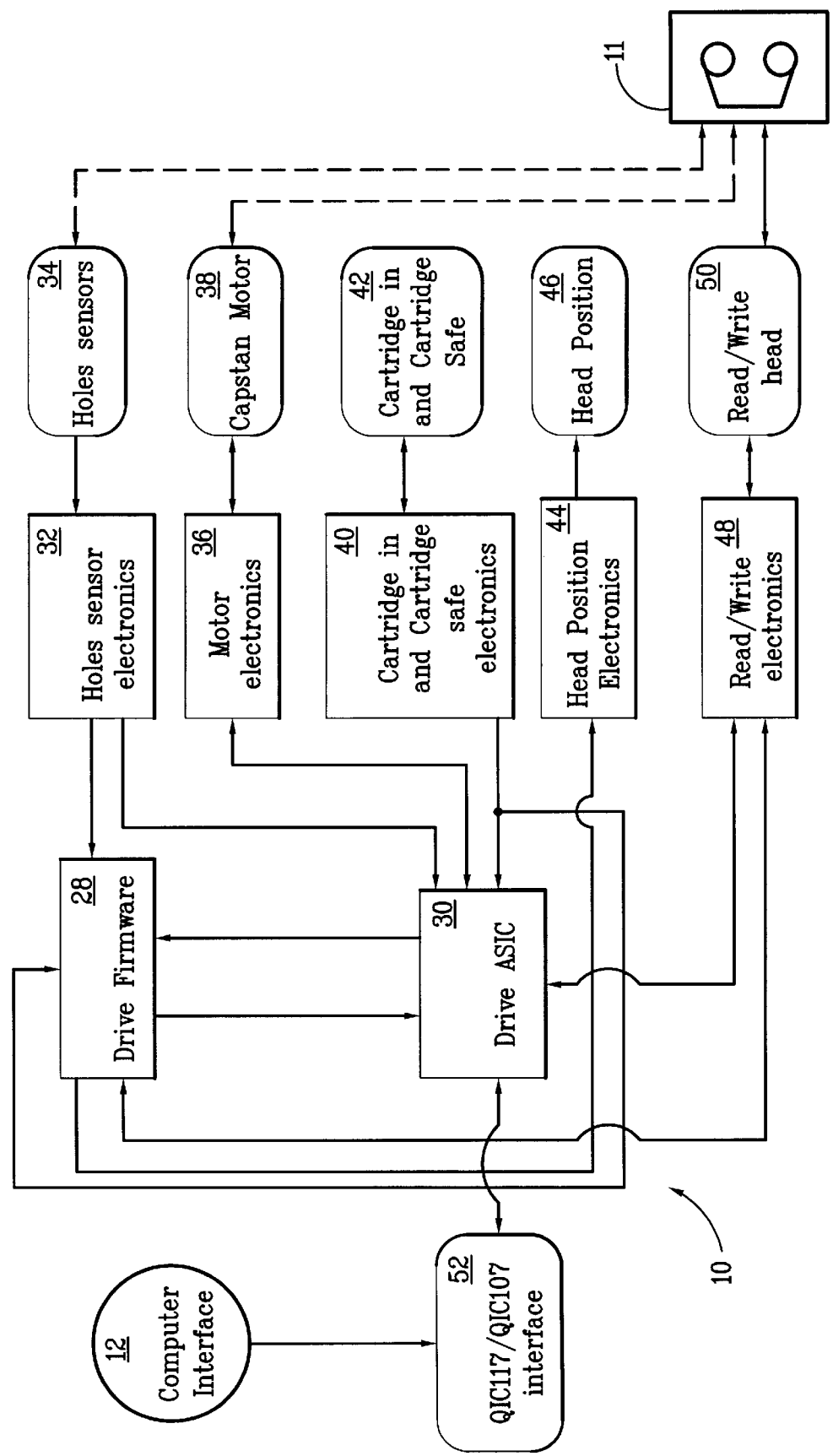
FIG. 2 is a block diagram of a tape drive system in accordance with the present invention.

Further details of tape drive 10 are shown in a block diagram form in FIG. 2. The tape drive system comprises two major components: A tape cartridge 11, which is further described below with reference to FIG. 3, and a tape drive 10. The drive electronics include a standard QIC-117/QIC-107 interface that comports with the QIC interface standard requirements, such as pin locations and voltage requirements, a drive application specific integrated circuit (ASIC) 30, which contains a microprocessor, memory, interface support circuitry, and other supporting circuitry, drive firmware (non-volatile memory) 28, which contains program code to implement various drive functions, as described in further detail below, and tape interface electronics. In addition, information related to the various tape formats, number of poles per rotation of the capstan motor, etc. may be stored as part of the program code in the Drive Firmware 28. Thus, as new tape formats are developed, the capabilities of the tape drive 10 may be enhanced by updating the firmware. The tape interface electronics further include hole sensor electronics 32 and hole sensors 34, motor electronics 36 and motor 38, cartridge load status electronics 40 and 42, head position electronics 44 and head positioning apparatus 46, and read/write electronics 48 and read/write head 50.

The operation of tape drive system 10 is in many aspects similar to conventional tape systems. When a tape cartridge 11 is inserted into drive 10, cartridge in and cartridge safe block 42 provides an output signal to the microprocessor contained in drive ASIC 30. Read/write head 50 interfaces with cartridge 11 to read and write data in response to user requests. Head position block 46 moves head 50 across the width of the tape for alignment of head 50 with a desired track. Hole sensors 34 detect holes located in the tape such as Beginning of Tape (BOT) holes, End of Tape (EOT) holes, and so on. Capstan motor 38 provides the mechanical force to the cartridge 11 to move the tape past read write head 50.

Figure 3:
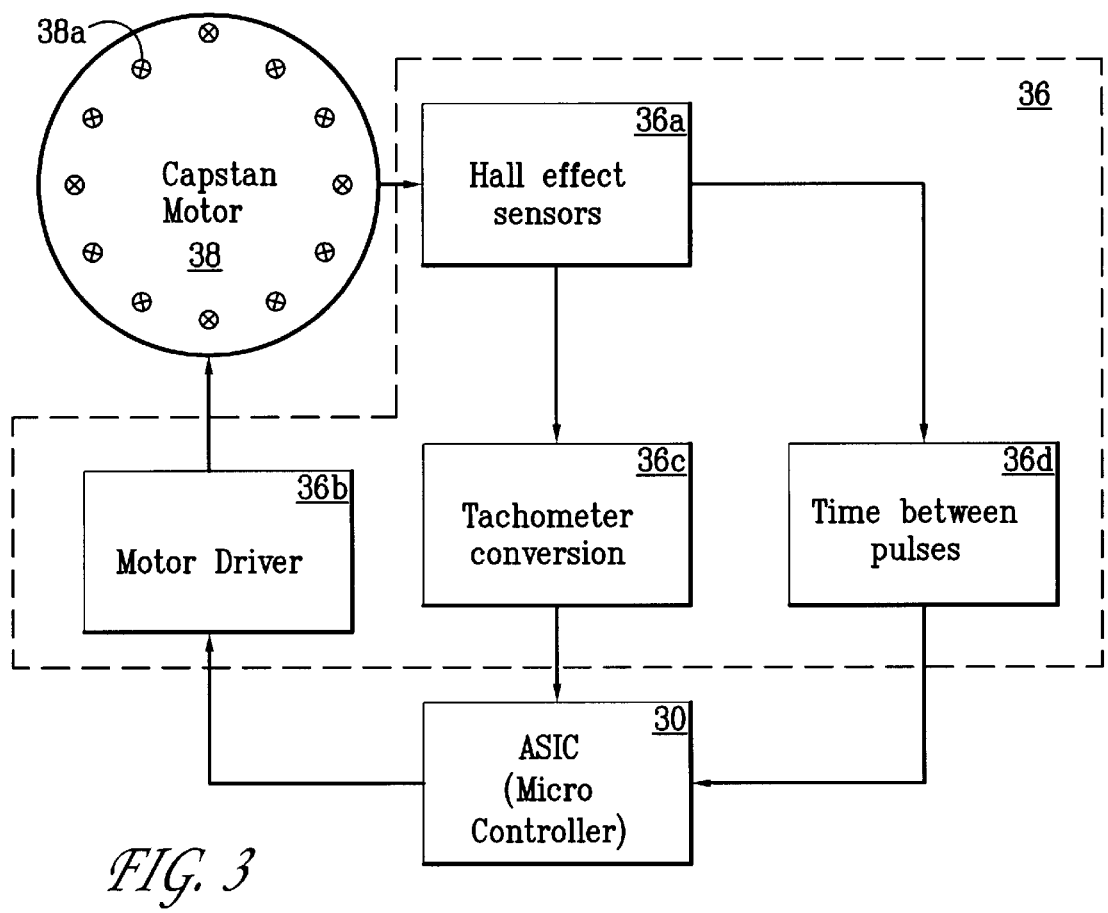
FIG. 3 is a block diagram of a capstan motor and associated motor electronics.

As shown in FIG. 3, the capstan motor 38 is controlled by motor driver 36b. The motor driver 36b receives pulse width modulated (PWM) signals from the ASIC (micro controller) 30. The capstan motor 38 includes eighteen (18) poles 38a which are detected by hall effect sensors 36a provided as part of the motor electronics 36. Upon detection of a pole 38a, the hall effect sensors 36a output signals to tachometer conversion circuitry 36c and pulse timing circuitry 36d. The tachometer conversion circuitry 36c provides an interrupt pulse to the ASIC 30, which maintains a count of the total number of received interrupt pulses. The pulse timing circuitry 36d outputs information indicative of a time period between detected poles 38a. This timing information is input to the ASIC 30 to control the rotational speed of the capstan motor 38 (e.g., as a servo loop). In the exemplary embodiment of FIG. 3, the capstan motor 38 is shown to include twelve (12) poles, which would produce twelve (12) pulses per revolution. It is within the scope of the present invention to provide a capstan motor 38 having additional or fewer poles.

Figure 4:
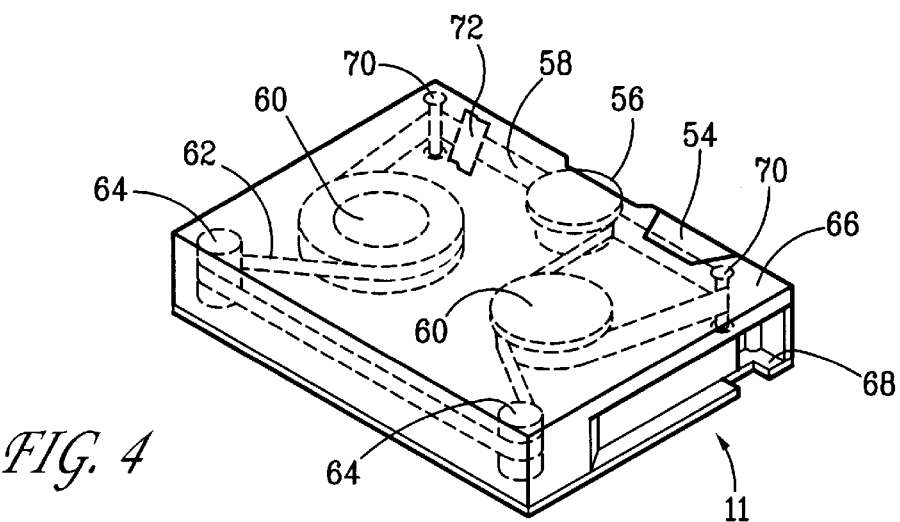
FIG. 4 is a perspective view of an exemplary tape cartridge employing aspects of the present invention.

A preferred embodiment of an exemplary tape cartridge 11 for use with the present invention is depicted in FIG. 4. Those of ordinary skill in the art will appreciate that cartridge 11 shares many attributes of well-known and available tape cartridges. For example, cartridge 11 includes a pair of reels 60 that are rotatably disposed on a base 68 and has a length of tape 58 that is spooled around reels 60. Tape 58 follows a tape path between reels 60 that runs parallel to a head access opening 54 and around tape guides 70. A drive belt 62 follows a path around a drive capstan 56, which is rotatably disposed near a front peripheral edge of the cartridge 10, and drive rollers 64 such that a portion of belt 62 contacts the spools of tape for moving the tape back and forth between reels 60. A reflector 72, which is used to detect holes (not shown) in tape 58, is provided behind tape 58 along a front peripheral edge of cartridge 11. Lastly, a housing 66 is mounted over base 68 forming an outer shell of cartridge 1. There are other well-known components in cartridges of the type shown in FIG. 4 that are left out of the present description for clarity and brevity.

The operation of the tape system is best described with reference to FIGS. 2 and 4. Read/write head 50 of drive 10 engages the length of tape 58 of cartridge 11 at head access opening 54. Capstan motor 38 engages capstan 56 causing belt 62 to move across tape spools 60 thereby moving the tape 58 across read/write head 50. Hole sensor 34 operates in conjunction with reflector 72 to detect holes embedded through tape 58. As is described more fully below, predefined hole patterns are disposed along a predetermined length of tape 58 to indicate features of tape cartridge 11 in accordance with the present invention.

FIG. 5 is a diagram of the tape 58 contained within cartridge 11. Tape 58, like most tapes, contains a beginning of tape (BOT) region 80, an end of tape (EOT) region 90, and a sequential access 88 (Backup Zone) region. Tracks run the entire length of the tape in a serpentine fashion. For example, even tracks (e.g., track T0, T2, and so on) are read in a first direction along the entire length of the tape and odd tracks (e.g., track T1) are read in the opposite direction along the entire length of the tape. Further, tape cartridge 11 has a number of physical attributes that provide identification and configuration information to drive 10 as defined by QIC standards (e.g., tape holes).

FIG. 6 illustrates a tape format structure specified by the QIC standard. The recording area of a tape track consists of a minimum of 429 segments for a 300 foot tape, separated from each other by 0.226 inches (5.740 mm). Each segment contains 29 data sectors and 3 error correction coding (ECC) sectors for a total of 32 sectors. Each of the sectors are separated by an inter-sector gap (shown as Gap 3). Under the QIC standard, a 300 foot tape contains a minimum of 13,504 sectors per track, and all tape tracks are formatted to the same number of segments and sectors.

As note above, when a conventional tape drive receives a command to move the tape a number of segments, the position of the tape is determined based on a number of detected and counted inter-sector gaps during the movement of the tape. The unique method and apparatus of the present invention, however, positions the tape without detecting the intersector gaps.

Figure 7:
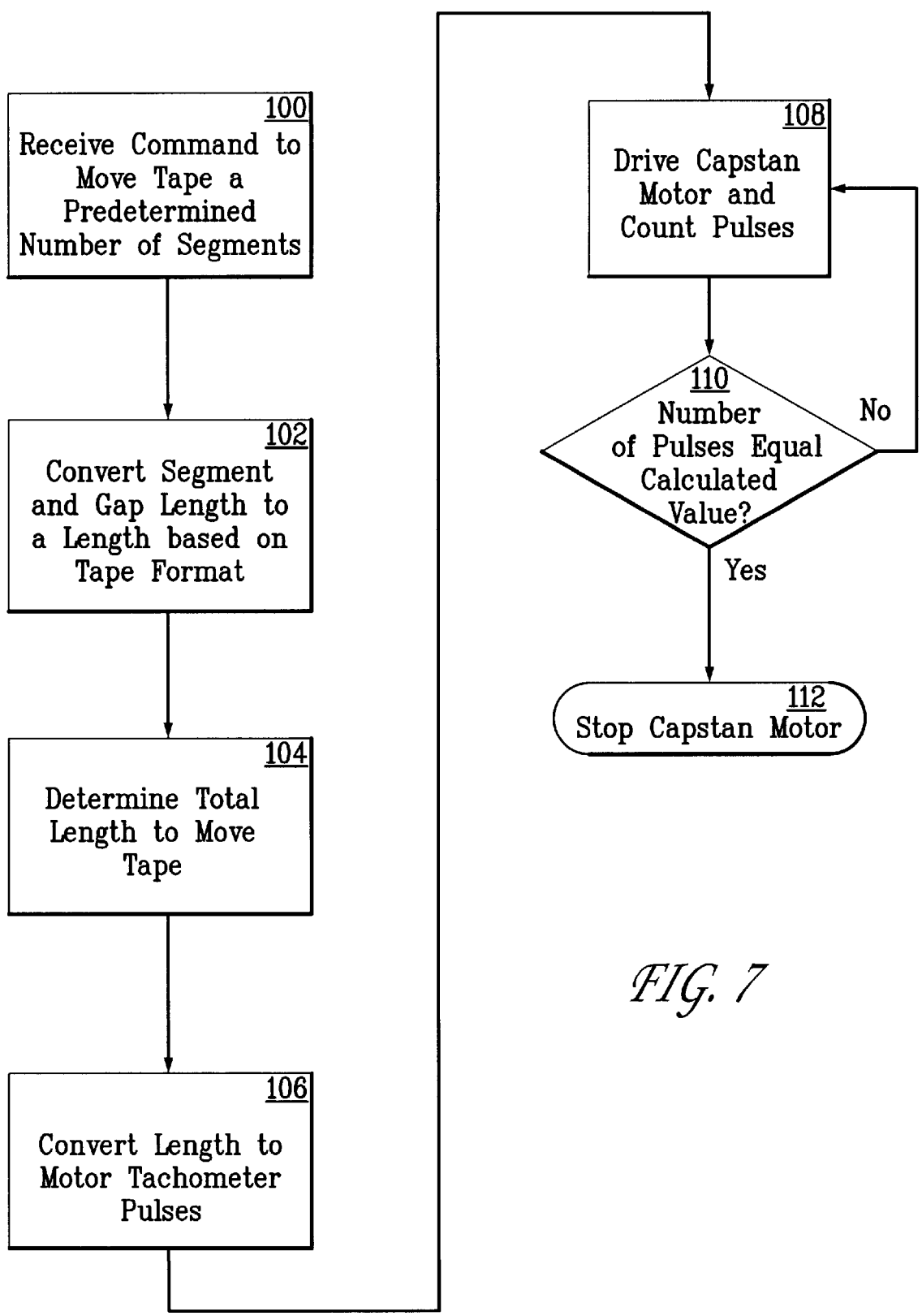
FIG. 7 is a flow chart of the processes performed in accordance with the present invention to position the tape.

With reference to FIGS. 2, 3 and 7, an exemplary process of positioning a tape in accordance with an aspect of the present invention will be described.

At step 100 the tape drive 10 receives a command via the QIC-117/QIC-107 interface 52 to move the tape to a new position based on a specified number of segments. At step 102, the tape drive ASIC 30 determines a length of each segment and inter-segment gap on the tape in accordance with a determined tape format. The tape format may be determined by the detecting the holes located in the tape using the hole sensors 34. At step 104 a total length to move the tape is calculated based on the number of segments received at step 100 and the length per segment calculated at step 102. The total length is converted to capstan motor tachometer pulses at step 106. As noted above, tachometer conversion circuitry 36c outputs pulses representative of the rate of revolution of the capstan motor 38. In the present embodiment, the relationship between capstan motor rotation (i.e., a number of pulses) and tape travel is linear, therefore, a selected length of tape travel can be converted into a number of tachometer pulses.

At step 108 the capstan motor 38 is driven by the motor driver 36b to move the tape. Also at step 108, as the capstan motor 38 rotates, the poles 38a are detected by the hall effect sensors 36a and motor tachometer pulses are output by the tachometer conversion circuitry 36c (or pulse timing circuitry 36d) which are counted by the ASIC 30. At step 110, it is determined if the calculated number of tachometer pulses at step 106 has been reached, and if so, the capstan motor 38 is stopped at step 110 to stop the movement of the tape. If the calculated number of pulses has not been reached, then the capstan motor driving continues at step 106, until such time the calculated number of pulses has been reached.

By way of a non-limiting example, the capstan motor 38 may produce eighteen (18) tachometer pulses per revolution. Further, for each complete revolution of the capstan motor 38, the tape 58 travels one and one-half inches. Accordingly, for each inch of tape travel, the capstan motor 38 produces twelve (12) tachometer pulses. Further, based on a selected format of the tape, each segment and inter-segment gap occupies a predetermined distance (e.g,. 8 inches). Therefore, if the host software requests that the tape be moved 100 segments, the tape drive 10 converts the number of segments into 800 inches (100 segments * 8 inches/segment), which is then converted into 9600 tachometer pulses (800 inches * 12 pulses/inch) output by the tachometer conversion circuitry 36c. As the tape is moved the tachometer pulses interrupt the ASIC 30 such that the ASIC 30 maintains a count of the total number of tachometer pulses received. In the present example, once 9600 pulses are received, the capstan motor 38 is stopped.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

In particular, the tape drive may accept tapes have a length other than 300 feet and having other formats than those disclosed herein. Additionally, while one particular type of tape cartridge has been described herein, other cartridge types may be used. Also, the present invention is not limited to recording tape contained within a cartridge, but also may be utilized in reel-to-reel or open reel systems. Although unit of measurement has been described as inches and feet, other units (i.e., metric) may be employed in the various calculations and determinations of the present invention.

What is claimed is:

1. A method for positioning a recording tape loaded into tape drive, said recording tape include data written in segments which are defined by a format of said recording tape, said method comprising:

determining said format of said tape from physical indicia located on said tape;

receiving a command indicative of a predetermined number of segments to move said recording tape;

converting said predetermined number of segments to a distance value in accordance with said format, said distance value being based on said predetermined number of segments, a length of a segment and a length of an inter-segment gap which disposed between adjacent segments;

determining a number of pulses per unit of movement length of tape generated by a tape drive motor;

calculating a total number of pulses representative of said predetermined number of segments based on said distance value and said number of pulses per unit of movement length;

moving said recording tape without reading from, or writing to, said recording tape during movement over said total number of pulses; and thereafter stopping said recording tape.

2. A tape drive for reading, writing and positioning a tape, said recording tape including data written in segments which are defined by a format of said recording tape, said tape drive comprising:

a processor that determines a movement length in accordance with a predetermined number of segments to move said recording tape, and a length of each segment and a length of an inter-segment gap which is disposed between adjacent segments, said processor calculating said distance value in accordance with said movement length;

a non-volatile memory;

a tape format detection device that determines said tape format from physical indicia located on said recording tape;

a recording head positioning and controlling device; and a drive motor, wherein when said processor receives an instruction to move said recording tape, said processor converts said predetermined number of segments to a distance value in accordance with said format of said recording tape, and wherein said drive motor periodically outputs a signal to said processor which is indicative of rotation of said drive motor, and said processor detects the relative movement of said recording tape based on said signal and without reading from, or writing to, said recording tape during movement until said distance value is attained, and thereafter, instructs said drive motor to stop said recording tape.

3. The tape drive as recited in claim 2, wherein a counter is incremented upon receipt of said signal, a current value of said counter being compared with said distance value, and when said current value equals said distance value, said drive motor is stopped.

4. The tape drive as recited in claim 2, wherein said processor determines a number of pulses per unit movement length of tape generated by a tape drive motor, and calculates said distance value in accordance with said movement length and said number of pulses per unit movement length.

5. The tape drive as recited in claim 4, wherein said drive motor periodically outputs pulses indicative of rotation of said drive motor to a counter, said counter incrementing a current value upon receipt of said pulses, and said processor compares said current value to said distance value, and when said current value equals said distance value, instructs said drive motor to stop said recording tape.

6. The tape drive as recited in claim 2, said distance value being correlated to a rotational amount of said drive motor, wherein when said drive motor is operated to move said tape, said distance value is compared to said rotational amount of said drive motor to determine a position to stop said recording tape.

7. The tape drive as recited in claim 2, further comprising a hall effect sensor which outputs pulses to said processor.

8. The tape drive as recited in claim 7, said drive motor comprising magnetic poles which are detected by said hall effect sensor, wherein when said hall effect sensor detects said magnetic poles, said pulses are output to said processor.

* * * * *